United States Patent [19]
Sackmann et al.

[11] 3,907,758
[45] Sept. 23, 1975

[54] ADDITIVES FOR PAPER

[75] Inventors: Günter Sackmann, Opladen; Günter Kolb, Leverkusen; Friedhelm Müller, Odenthal, all of Germany

[73] Assignee: Bayer Aktiengesellschaft, Germany

[22] Filed: Sept. 9, 1974

[21] Appl. No.: 504,558

[30] Foreign Application Priority Data
Sept. 12, 1973   Germany............................ 2345922

[52] U.S. Cl. ... 260/79.3 MU; 162/168; 260/86.1 R; 260/86.1 E; 260/86.1 N
[51] Int. Cl.² ... C08F 220/00; C08G75/00; D21D 3/00
[58] Field of Search.. 260/79.3 MU, 86.1 R, 86.1 E, 260/86.1 N

[56] References Cited
UNITED STATES PATENTS

| | | | |
|---|---|---|---|
| 2,862,893 | 12/1958 | Hwa | 260/79.3 MU |
| 3,323,979 | 6/1967 | Foster et al. | 162/167 |
| 3,410,649 | 11/1968 | Sellet | 162/167 |
| 3,700,635 | 10/1972 | Brust et al. | 260/79.3 MU |
| 3,758,445 | 9/1973 | Cohen et al. | 260/86.1 N |
| 3,842,054 | 10/1974 | Keim | 260/86.1 N |

OTHER PUBLICATIONS

Schiller et al., Industrial and Engineering Chemistry, Vol. 48, No. 12, December 1956, pp. 2132-2137.

*Primary Examiner*—Ronald W. Griffin
*Attorney, Agent, or Firm*—Connolly and Hutz

[57] ABSTRACT

Additives used for increasing the retention of fibers and fillers in the production of paper and in the treatment of sewage, the additives being copolymers of 85–95 % by weight of Mannichbases of (meth)acrylamide carrying at least one hydroxyalkyl group or being derived from heterocyclic sec. amines and 15–5 % by weight of tertiary or quaternary aminoalkyl(meth)acrylates.

1 Claim, No Drawings

ADDITIVES FOR PAPER

This invention relates to additives used for increasing the retention of fibers and fillers both in the production of paper and in the treatment of sewage, the additive being based on copolymers of special Mannich bases of (meth) acrylamide and tertiary or quaternary aminoalkyl (meth) acrylates.

It is known that water-soluble polymers based on poly(meth) acrylamide can be used for increasing the retention of fibers and fillers in the production of paper.

According to one of our own earlier proposals (cf. German Offenlegungsschrift No. 2,255,391), this effect can be improved by using high molecular weight cationic copolymers of (meth) acrylamide and tertiary or quaternary aminoalkyl (meth) acrylates copolymerized in from 1 to less than 10% by weight aqueous solutions in the presence of from 0.005 to 0.1% by weight a Redox system of a water-soluble percompound and from 0.005 to 0.1% by weight of a compound containing at least one primary amino group or its water-soluble salt all the percentages being based on the total monomer used, and optionally in the presence of at most 10% by weight of a water-soluble metal salt, based on the sum of water and metal salt, at a temperature in the range from 10° to 40°C.

It is also known that polymeric Mannich bases can be obtained by reacting homopolymers or copolymers of acrylamide with formaldehyde and primary or secondary amines (Schiller and Suen, Ind. and Engng. Chem. 48 (1956) 2132). The use of products of this kind, prepared using dimethyl or diethyl amine as the secondary amine, as dehydrating additives is already described in U.S. Pat. No. 3,323,979. Although products of this kind shown improved dehydrating properties compared with unmodified polymers, they also have unfavourable physiological properties and in use smell strongly on account of the fact that only amines of low boiling point are used. If, however, amines having a higher boiling point are used to overcome this disadvantage, the solubility of these products in water is adversely affected, with the result that it is extremely difficult, if not impossible, to dilute them to the extremely low concentration required for the production of paper. In addition, they are far less active as retention agents.

It has now surprisingly been found that water soluble amines of a relatively high boiling point can be also used providing they contain at least one hydrophilic functional group, for example a hydroxyl group, or providing they are isocyclic or heterocyclic in character. Compared with conventional products, these products show an improved retention capacity, a comparatively lower viscosity in aqueous solutions for the same concentration, a greater affinity for dilution with water and improved physiological properties.

Since solutions of Mannich bases of this kind, due to their production, still contain free amines in equilibrium, the question of biological degradability is important. Investigations have shown that aliphatic amines having hydroxyl groups are more readily degraded in sewage than amines without those groups. Thus, monoethanolamine undergoes 60% degradation after 20 days (C. B. Lamb and G. F. Jenkins BOD of synthetic organic chemicals, Purdue Conf., 7 (1952) 326–339), whilst diethanolamine undergoes 90% degradation after only 10 days (A. C. E. Oberton and V. T. Stack Jr: BOD of organic chemicals: Sewage Ind. Wastes 28 (1957) 1267–1272); in the case of cetytrimethyl ammonium bromide, the degradation rate after 5 days amounts to 0% (W. Winter: Biodegradation of detergents in sewage treatment, Wasserwirtsch - Wassertech 12 (1962) 265–271).

Accordingly, the invention relates to an additive for increasing the retention of fibers and fillers in the production of paper or in the treatment of sewage which is based on a copolymer consisting essentially of a. 85 to 95% by weight of statistically distributed polymeric units of Mannich bases corresponding to the formula

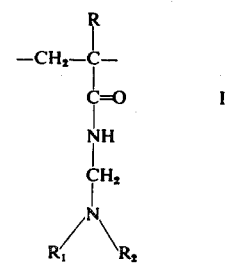

in which

R represents hydrogen or methyl;

$R_1$ represents a hydroxy alkyl group with 2 or 3 carbon atoms;

$R_2$ represents an alkyl group with 1 or 2 carbon atoms;

$R_1$ and $R_2$ each represent a hydroxy alkyl group with 2 or 3 carbon atoms or $R_1$ and $R_2$ together with the N-atom to which they are attached

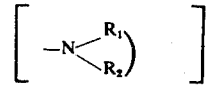

represent a pyrrolidine, morpholine, N-methylpiperazine or N-ethylpiperazine ring, and b. 15 to 5% by weight of statistically distributed polymer units of aminoalkyl (meth) acrylates corresponding to the formula

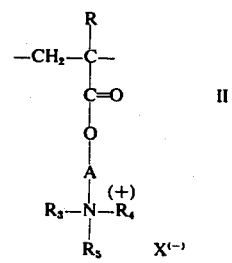

in which

R represents hydrogen or methyl;

A represents an alkylene radical with from 2 to 4 carbon atoms;

$R_3$ represents hydrogen or alkyl with from 1 to 4 carbon atoms;

$R_4$ and $R_5$ represent alkyl with 1 to 4 carbon atoms and $X^{(-)}$ represents a negative group capable of salt formation with the amide nitrogen, such as halide, acetate, methosulphate or tolylsulphate.

In formula II above, R is preferably hydrogen or methyl, A is preferably an ethylene group, $R_3$ is preferably hydrogen, $R_4$ and $R_5$ are preferably a methyl or ethyl group and $X^{(-)}$ is preferably chloride.

The copolymers of (meth) acrylamide and salts of tertiary or quaternary aminoalkyl (meth) acrylates are prepared in oxygen-free aqueous solution, the monomers being copolymerized in the form of from 1 to less than 10% by weight aqueous solutions in the presence of a redox system of from 0.005 to 0.1% by weight of water-soluble percompounds and from 0.005 to 0.1% by weight of a compound containing at least one primary amino group or water-soluble salt thereof based on the total monomer used, and optionally in the presence of at most 10% by weight of a water-soluble metal salt, based on the sum of water and metal salt, at a temperature in the range from 10° to 40°C.

The monomer is acrylamide and /or methacrylamide, preferably acrylamide.

Preferred aminoalkyl(meth)acrylates are dimethylaminoethylacrylate, dimethylaminoethylmethacrylate, diethylaminoethylacrylate, diethylaminoethylmethacrylate, or the hydrochlorides of these compounds.

(Meth)acrylamide and an aminoester together are used in the form of from 1 to less than 10% by weight, preferably in the form of from 2 to 6% by weight, aqueous solutions for copolymerization.

The monomer mixture used consists of from 80 to 95% by weight of (meth)acrylamide and of from 5 to 20% by weight of the aminoester.

The monomers are present in the copolymer in substantially the initial ratio. If they are present in a quantity of less than 5% by weight, the monomers show inadequate cation activity, while when they are present in quantities of above 30% by weight the products obtained have extremely high molecular weights.

The monomer units are incorporated into the copolymers in a substantially statistical distribution.

The copolymers procuced have intrinsic viscosities $[\eta]$ of from 12 to 25 (dl/g), as measured in a 0.9% by weight NaCl solution at $t = 25°C$.

The aqueous copolymer solutions obtained contain from 1 to 10% by weight, preferably from 2 to 6% by weight, of solid copolymer and have viscosities of from 6000 to 80,000 cP, preferably from 10,000 to 40,000 cP, at $t = 20°C$.

The polymerization initiators used are redox systems containing, as their oxidizing component, water-soluble compounds, such as alkali metal or ammonium persulphate, hydrogen peroxide, tertiary butyl hydroperoxide, or percarbonates and perphosphates. The reducing components of the redox systems are compounds which are soluble in water or are salts of these compounds and contain at least one primary amino group, such as diethylenetriamine, triethylenetetramine, methylamine, n-butylamine, isobutylamine, cyclohexylamine, p-tolidine or aminoethylmethacrylate hydrochloride.

It is preferred to use redox systems of potassium persulphate or ammonium persulphate and aminoethylmethacrylate hydrochloride, cyclohexylamine or isobutylamine.

The percompounds or the compounds containing at least one primary amino group are each used in quantities of from 0.005 to 0.1% by weight, based on total monomer.

Copolymerization may optionally be carried out in the presence of water-soluble metal salts, such as sodium chloride, sodium sulphate, magnesium chloride, aluminium sulphate or sodium acetate. These simple electrolytes can be present in the polymerization mixture in quantities of up to 10% by weight, based on the sum of water and water-soluble metal salt.

The Mannich bases are preferably prepared in known manner by reacting the polymers which contain amide groups in aqueous solution with an aminomethylation reagent which is obtained by reacting the particular amine or mixtures thereof with formaldehyde, at room temperature in the presence or absence of catalysts. Examples of suitable amines include 2-methylamino ethanol, 2-ethylaminoethanol, 1-methylamino-2-propanol, 1-methylamino-3-propanol, 2-methylamino-1-propanol, 1-ethylamino-2-propanol, 1-ethylamino-3-propanol, 2-ethylamino-1-propanol, diethanolamine, morpholine, pyrrolidine, N-methylpiperazine and N-ethylpiperazine or mixtures thereof. 2-Methylaminoethanol, 1-methylamino-2-propanol, diethanolamine, morpholine, pyrrolidine or N-methylpiperazine, or mixtures thereof, are preferably used.

The molar ratio of amine to formaldehyde is between 1:1 and 5:1, preferably amounting to 2:1. Copolymer solutions containing from 1 to 10% by weight and preferably from 2 to 6% by weight of solid copolymer can be used as the copolymer solutions. The Mannich base solutions thus formed have viscosities of from 1500 to 60,000 cP, preferably from 2000 to 8000 cP, at $t = 25°C$.

Reaction of the copolymer containing amide groups to form the Mannich base may optionally be carried out in the presence of a water-soluble metal salt, such as sodium chloride, sodium sulphate, magnesium chloride, aluminium sulphate or sodium acetate.

These simple electrolytes can be present in the polymerization mixture in quantities of up to 10% by weight, based on the sum of water and water-soluble metal salt.

However, it is also possible to prepare the paper additives of the invention by copolymerizing the monomeric Mannich bases of (meth)acrylamide and the tertiary or quaternary aminoalkyl (meth)acrylates. The Mannich bases can be prepared in known manner from the methylol ethers or the free methylol compounds and the required secondary amines, or from (meth) acrylamide, formaldehyde and the required secondary amines.

The products obtained in accordance with the invention can be used in the paper industry and in the purification and treatment of sewage. Irrespective of pH, but especially in the neutral and acid range they provide a high level of retention of fibers and fillers on the papermachine wire in the production of paper, and accelerate the removal of water from the paper web without affecting anionic optical brighteners to any appreciable extent. These properties of the products according to the invention are considerably improved compared to those of unmodified products. Their affinity for dilution with water is also simultaneously improved. Thus, aqueous solutions of these Mannich bases can be directly added to the breast box of paper-making machines in diluted or undiluted form. In addition to this application, the products according to the invention can also be used in the treatment and purification of industrial and municipal sewage by sedimentation, filtration and flotation, their favourable physiological behaviour and their high biological degradability being particularly advantageous in this respect.

The percentage contents quoted in the following Examples relate to weight unless otherwise stated. Production of a starting material from acrylamide/diethylamino ethylmethacrylate hydrochloride copolymer:

170 liters of desalted water are introduced into a 250 liter capacity steel autoclave equipped with a stirrer and surmounted by a distillation bridge. The autoclave is then heated to 80°C and 12 liters of water distilled off under vacuum. 2 atms of pure nitrogen are then introduced into the autoclave and it is cooled to 25°C. A solution of 7200 g of acrylamide and 1800 g of diethylamino ethylmethacrylate hydrochloride in 9.4 liters of boiled, desalted water are then sucked into the autoclave through a capillary. Thereafter, a vigorous stream of nitrogen is blown through the solution for about one hour, and the autoclave is closed. 1.20 g of aminoethylmethacrylate hydrochloride (amine component of the redox system), dissolved in 2.16 liters of boiled, deslated water, are then quickly introduced through a dropping funnel while nitrogen is passed over, the reaction mixture followed by the dropwise addition of 2.40 g of potassium persulphate, dissolved in 2.52 liters of boiled, desalted water, over a period of 1 hour. On completion of the dropwise addition, the autoclave is closed and nitrogen is introduced under a pressure of 2 atms. After a reaction time of 24 hours at 25° to 30°C, a crystal-clear highly viscous solution (32,000 cP at $t = 20°C$) is formed and can be forced out of the reaction vessel by applying an excess pressure.

The cationic polyacrylamide thus prepared has an intrinsic viscosity $[\eta]$ of 21.76 (dl/g), as measured in 0.9% NaCl solution at $t = 25°C$. The copolymer consists of copolymerized, substantially statistically distributed units of approximately 80% by weight of acrylamide and 20% by weight of diethylaminoethyl methacrylate hydrochloride.

PREPARATION OF THE RETENTION AGENT 100 g of a 30% aqueous formaldehyde solution are added dropwise at 40°C to a solution of 2 mols of each of the amines specified in the following Table, in a 1 liter 3-necked flask equipped with a stirrer, internal thermometer and reflux condenser. The quantity of water is selected in such a way that 1 g of the end solution contains 0.056 g of formaldehyde.

182 g of these solutions are stirred with 500 g of a 6% aqueous solution of a copolymer of 80% by weight of acrylamide and 20% by weight of dimethylaminoethylmethacrylate hydrochloride, 30 g of sodium chloride and 288 ml of water in a stirrer-equipped vessel until a homogeneous, crystal-clear mixture is obtained.

EXAMPLE 1

A paper was produced in a test paper-making machine (Kammerer system) from a pulp consisting of 70% of bleached softwood sulphite cellulose and 30% of bleached hardwood sulphate cellulose ground to 40° on the Schopper-Riegler scale at pH 4.8. in the presence of 25% china clay, 1% resin size (Na-abietate) and 3% aluminium sulphate (the percentages in each case based on dry cellulose). Heavily water-diluted solutions (approximately 0.05% by weight) of the retention agents described above were continuously added just before the breast box of the machine. The retention effect was determined by measuring the solids content of the effluent of the paper-making machine.

The results are set out in the following Table, the quantities added being expressed as 100% products, based on dry cellulose:

| Retention agent | Solids content of effluent for the addition of | | | |
|---|---|---|---|---|
| | 0.00% mg/l | 0.0024% mg/l | 0.0048% mg/l | 0.0072% mg/l |
| Unmodified copolymer(acryl amide/diethyl aminoethylmethacrylate. HCl copolymer) | 530 | 297 | 234 | 185 |
| 5 | 530 | 267 | 182 | 138 |
| 6 | 530 | 222 | 164 | 127 |
| 2 | 530 | 234 | 156 | 134 |

COMPARISON EXAMPLE 1

A polymeric Mannich base obtained by reacting polyacrylamide with formaldehyde and dimethylamine was used for this comparison example. Investigation showed that its retention effect, determined under the same conditions as in Example 1, was better than that of the unmodified copolymer and slightly poorer then that of the Mannich bases mentioned in Example 1. In addition to its already mentioned disadvantages, of poor degradability and strong smell, the product has the further disadvantage of a very low affinity for dilution to the low concentrations required in the production of paper.

| Retention agent | Solids content of effluent for additions of | | | |
|---|---|---|---|---|
| | 0.00% mg/l | 0.002% mg/l | 0.0048% mg/l | 0.0072% mg/l |
| Polyacrylamide Mannich base of formaldehyde and dimethylamine | 530 | 228 | 150 | 145 |

| Retention Agent | Amine | Composition of the retention agent, polymeric units of Mannich bases (*) | Concentration of the solution of the retention agent, based on starting copolymer | Viscosity of the retention agent at $t = 25°C$. |
|---|---|---|---|---|
| 1 | 2-methylamino ethanol | 90.0% by weight | 2.0% by weight | 2600 cP |
| 2 | 1-methylamino-2-propanol | 90.7% by weight | 3.0% by weight | 5400 cP |
| 3 | diethanolamine | 91.8% by weight | 1.2% by weight | 4300 cP |
| 4 | morpholine | 90.7% by weight | 3.0% by weight | 6000 cP |
| 5 | pyrrolidine | 89.7% by weight | 2.5% by weight | 3100 cP |
| 6 | N-methyl piperazine | 91.3% by weight | 2.5% by weight | 2000 cP |

(*) difference between the respective percentages and 100 = % by weight of aminoester in retention agent

EXAMPLE 2

The test was carried out and the test results evaluated in the same way as described in Example 1.

| Retention agent | Solids content of effluent for additions of | | | |
|---|---|---|---|---|
| | 0.00% mg/l | 0.0024% mg/l | 0.0048% mg/l | 0.0072% mg/l |
| Unmodified copolymer (cf. Example 1) | 610 | 386 | 243 | 193 |
| 1 | 610 | 267 | 192 | 140 |

EXAMPLE 3

The test was carried out and the test results evaluated in the same way as Example 1 and 2.

| Retention agent | Solids content of effluent for additions of | | | |
|---|---|---|---|---|
| | 0.00% mg/l | 0.0024% mg/l | 0.0048% mg/l | 0.0072% mg/l |
| Unmodified copolymer (cf. Example 1) | 623 | 414 | 335 | 269 |
| 4 | 623 | 370 | 294 | 232 |

We claim:

1. Additives useful for increasing the retention of fibers and fillers in the production of paper or in the treatment of sewage comprising copolymers consisting essentially of 85 to 95% by weight of statistically distributed polymeric units of Mannich bases corresponding to the formula:

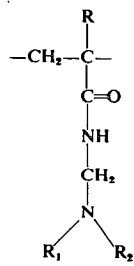

wherein
R is hydrogen or methyl;
$R_1$ is hydroxyalkyl having 2 to 3 carbon atoms;
$R_2$ is alkyl having 1 to 2 carbon atoms;
$R_1$ and $R_2$ are each hydroxyalkyl having 2 to 3 carbon atoms;
$R_1$ and $R_2$ together with the nitrogen atom to which they are attached are pyrrolidino, morpholino, N-methylpiperazino or N-ethylpiperazino and
15 to 5% by weight of statistically distributed polymeric units of the fomula:

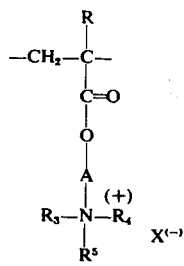

wherein
R is hydrogen or methyl;
A is alkylene having 2 to 4 carbon atoms;
$R_3$ is hydrogen or alkyl having 1 to 4 carbon atoms;
$R_4$ and $R_5$ are alkyl having 1 to 4 carbon atoms $X^{(-)}$ is a negative group capable of salt formation with the amine nitrogen selected from the group consisting of halide, acetate, methosulphate and tolylsulphate.

* * * * *